Oct. 17, 1967 — E. E. SUTTON — 3,347,153

TOASTER

Filed Jan. 26, 1966 — 2 Sheets-Sheet 1

INVENTOR.
EARL E. SUTTON
BY
ATTORNEYS.

Oct. 17, 1967     E. E. SUTTON     3,347,153
TOASTER
Filed Jan. 26, 1966     2 Sheets-Sheet 2

INVENTOR.
EARL E. SUTTON
BY
ATTORNEYS 3,347,153
TOASTER
Earl E. Sutton, Mansfield, Ohio, assignor to Dominion
Electric Corporation, a corporation of Ohio
Filed Jan. 26, 1966, Ser. No. 523,105
10 Claims. (Cl. 99—337)

ABSTRACT OF THE DISCLOSURE

An electric bread toaster having two tubular quartz electrical resistance elements disposed horizontally on opposite sides of the bread-receiving slot in the toaster and approximately mid-way between top and bottom thereof, having reflectors of generally hyperbolic form disposed outwardly of the resistance elements to reflect energy therefrom upon the bread to be toasted, the resistance elements extending substantially the length of the reflectors and bread-receiving slot to assure uniform toasting of the bread from end to end, a hinged cover for the toaster over the bread-receiving slot, and a switch operated by the cover and connected to the toasting circuit to assure that the resistance elements are not energized when the cover is down closing the bread-receiving slot and thus preventing dangerous heating of the toaster when closed.

---

My invention relates to toasters for bread and the like.

An object of my invention is the provision of a novel toaster having improved toasting characteristics.

Another object is the provision of a heating structure and arrangement in a toaster which produces an improved toasting action.

Another object is the provision for directing a maximum of available energy from a source of infrared energy upon bread or the like to be toasted.

Another object is the provision of an improved energy reflecting surface in a toaster.

Another object is the provision for unique utilization of emitters of infrared energy in a toaster.

Another object is the provision of a cover for a toaster arranged to cover the well of the toaster when the toaster is not in use and to be swung out of the way when the toaster is in use.

Another object is the provision of a switching arrangement for automatically discontinuing the supply of electric current to electric heating elements of a toaster when the well of the toaster is closed by a cover.

Other objects and a fuller understanding of the invention may be had by referring to the following description and claims, taken in conjunction with the accompanying drawings, in which:

Figure 1:
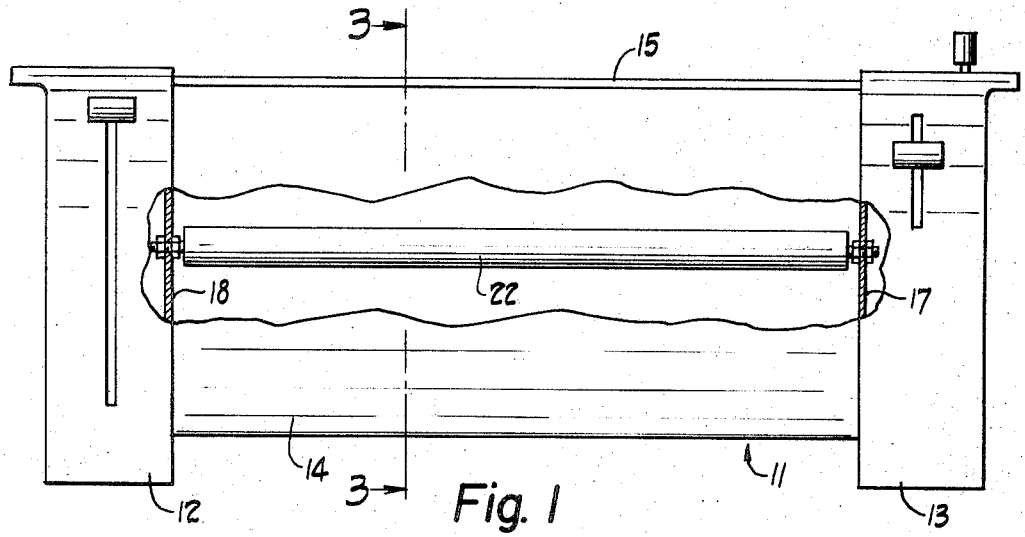
FIGURE 1 is a side view, partially in section, of a toaster embodying my invention.
Figure 2:
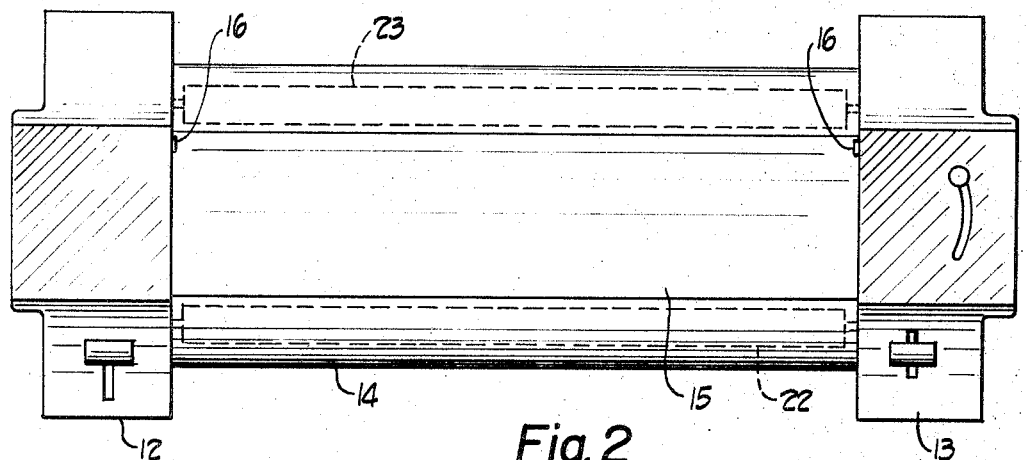
FIGURE 2 is a plan view looking down on the same.

My improved toaster embodied in this invention has a housing denoted generally by the reference character 11. The housing 11 has one end member 12 and another end member 13 composed of molded plastic material preferably of electrical and heat-insulating characteristics. These end members 12 and 13 are disposed at opposite ends of the structure and are interconnected by a metallic shell 14 extending therefrom. This shell 14 has an open top to provide access to the well of the toaster in which bread slices are disposed for toasting. The bottom of the shell is closed, except for openings (not shown) to permit crumbs and the like to escape.

Figure 5:
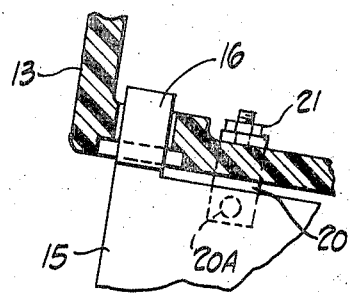
FIGURE 5 is an enlarged detail view partially in section showing the hinged mounting of the cover on the toaster, taken through the line 5—5 of FIGURE 6.
Figure 6:
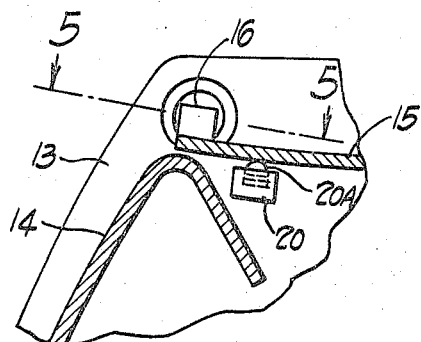
FIGURE 6 is another enlarged detail view of the hinged mounting of the cover on the toaster.

Disposed over and extending longitudinally along the shell 14 is a cover member 15. This cover 15 is hingedly connected by hinge elements 16 at its opposite ends and at one side thereof to the oppositely disposed end members 12 and 13. The pins or pintles of the hinge elements 16 are disposed in aligned openings in the end members 12 and 13. One of the hinge elements 16 is shown in detail in FIGURES 5 and 6 which show its mounting in the end member 13. The disposition of the cover 15 is such that when the toaster is out of use, that is, when not being used for toasting, then the cover 15 may be disposed across the top and over the well of the toaster to thus keep dust and other material from entering the well of the toaster. When the toaster is being used for toasting bread, then the cover 15 is swung over and downwardly along the back of the toaster out of the way and thus to provide access to the interior of the toaster.

Carried by one of the end members, such as end member 13, is a normally closed switch element 20 having an upwardly biased button 20A so positioned as to be engaged and depressed by the cover 15 when in its closed position over the top of the toaster. A mounting 21 secures the switch element 20 to the end member 13.

Figure 7:
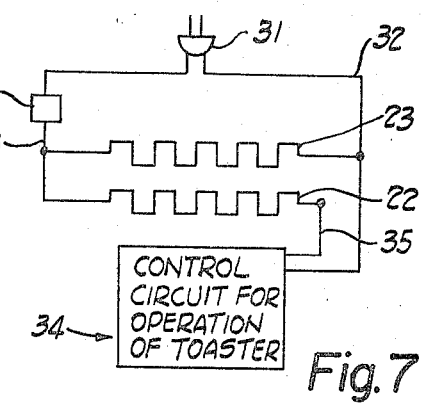
FIGURE 7 is a diagrammatical showing of the pertinent portion of the electrical circuit of the toaster.

As seen in FIGURE 7, the switch element 20 is so connected in the electrical circuit of the toaster as to cut off the flow of current to the heating elements thereof when the switch element 20 is opened by the cover 15 pressing downwardly upon the button 20A. This is a safety feature which prevents the energization of the heating elements and hence the generation of heat in the toaster when the cover is in its closed position over the top of the toaster well.

Carried by the end members 12 and 13 are upright supporting panels 18 and 17, respectively. Mounted upon these upright supporting panels are two tubular electrical resistance elements 22 and 23. These elements 22 and 23 are disposed parallel to each other in the same horizontal plane and on opposite sides of the bread disposed in the toaster intermediate the sides thereof. These heating elements 22 and 23 are preferably radiant energy heaters which emit infrared energy. They are preferably Vicor or quartz glass tubes. The length of the elements 22 and 23 is such as to extend substantially the length of the shell so as to extend along opposite sides of two pieces of bread disposed in tandem or alignment and arranged to heat the full length of the slices of bread along the length of shell 14.

Figure 4:
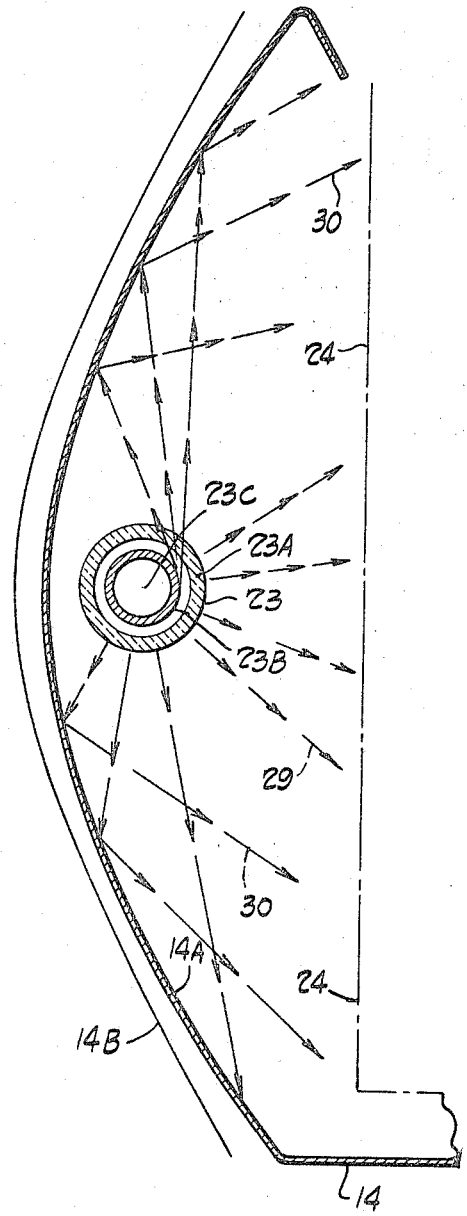
FIGURE 4 is an enlarged cross-sectional view illustrating the relative disposition of the reflecting surface and the tubular emitter of infrared energy.

The detail of the tubes is better seen in FIGURE 4 wherein there is an enlarged cross-sectional view of element 23, the two elements being similar in construction. On the outside of the element there is a tubular glass envelope 23A and concentrically mounted within it is a metallic resistance tubular core 23B disposed concentrically about the axis 23C. The metallic core 23B is of the required material and dimensions as to be highly resistant to flow of electric current therethrough and to generate infrared energy therefrom upon electrical energization thereof around the circumferential extent of the core 23B and through the glass (preferably quartz glass) tube 23A. This energy is emitted to be directed in all directions radially outward and tangentially of the metallic core 23B through the envelope 23A.

The disposition of the elements 22 and 23 relative to the side walls of the shell 14 is better illustrated in FIGURE 4 wherein is shown the one element 23 disposed adjacent one side of shell 14. The inner surfaces of the side walls of shell 14 are highly reflective in nature so as to reflect a high percentage of infrared energy directed thereon from the heating elements or infrared energy emitters. The theoretical curve of the surface of the side wall of shell 14 would be hyperbolic but due to the displacement of the metal film around the core 23B from the axis 23C and due to the necessity of keeping the over-all dimensions of the reflecting surfaces within practical limits of a usable, commercially salable toaster, the hyperbolic curve is modified to some extent. In FIGURE 4 the pure or theoretical hyperbolic curve is indicated by the reference character 14B whereas the quasi or modified hyperbolic curve of the side wall is indicated by the reference character 14A. It may be noted that for practical purposes, the curve 14A of the reflective surface may be referred to as generally or substantially hyperbolic in nature or character.

As seen in FIGURE 4, the direct emission of energy from the element 23, indicated by the arrows marked with reference character 29, are directed upon the bread surface 24 shown diagrammatically in FIGURE 4. Energy emitted from element 23 and reflected by the inner reflective surface of the hyperbolically curved wall 14A are depicted by the arrows marked with the reference character 30. It will thus be seen that a maximum amount of energy from the element 23 is received by the bread surface 24 by direct emission and by reflection of the energy means of the substantially hyperbolic curved surface 14A.

Figure 3:
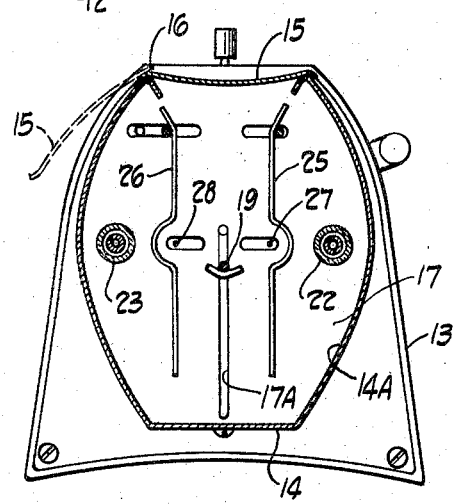
FIGURE 3 is a cross-sectional view taken through the line 3—3 of FIGURE 1.

The slice of bread is carried by a rack member 19 shown in FIGURE 3 and which extends horizontally along the toaster structure between the end members 12 and 13. The rack member 19 is movable upwardly and downwardly in an upright plane and is guided in that plane by slot 17A in upright panel 17 and by a corresponding slot in upright panel 18. Disposed on opposite sides of the toaster so as to embrace a slice of bread intermediate the side walls of the shell 14 are guard members 25 and 26 which may be moved inwardly toward and moved outwardly away from the bread carried on rack 19. Upon the rack 19 being moved downwardly to toasting position, the guard members 25 and 26 each carried by a movable bar are simultaneously moved inwardly toward and against the bread carried on the rack 19 by operating mechanism not shown. These guard members 25 and 26 carry with them sensor wires 27 and 28, respectively, mounted thereon. These wires are disposed to be placed against or in very close proximity with the bread upon the guard members 25 and 26 being moved inwardly against the bread on opposite sides thereof. The sensor wires 27 and 28 are adapted for sensing the temperature of the bread at the surfaces being toasted for the control of the operation of the toaster.

In FIGURE 7, the pertinent portion of the electrical circuit of the toaster, and particularly that relating to the switch element 20, is shown. A terminal or connector plug 31 is adapted to be connected to a source of electrical energy, such as the AC electrical power usually available in a house. This current from terminal 31 is carried by wires 32 and 33 to the two heating elements 22 and 23 connected as shown. The wire 32 is also connected to the control circuit and returned through wire 35 to resistance element 22 for the operation of the toaster which is shown in block form by the reference character 34 in the circuit shown in FIGURE 7.

The features of this invention are particularly adapted for use with the invention described and shown in copending application Ser. No. 523,221 filed concurrently herewith Jan. 26, 1966 entitled "Food Cooking Device," filed in the names of Earl E. Sutton and Terry M. Brain and assigned to the assignee of the instant application. Reference may be had thereto for features of that novel food cooking device.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:
1. A toaster for bread or the like comprising, a supporting shell structure having an upright slot extending downwardly from the upper open end thereof between opposite sides of the shell structure for accommodating therein bread or the like in a generally upright plane, a pair of tubular electrically energizable radiant infrared heaters disposed, respectively, on opposite sides of said slot and extended substantially the full length of said shell and horizontally along the length of said slot substantially equidistant the top and bottom of said slot, a pair of reflectors disposed, respectively, on opposite sides of said slot, said reflectors each being formed in a modified hyperbolic continuous curve generated about the axis of each said heater, the said axis being spaced toward said slot from the axis of a corresponding true hyperbolic curve, heat energy directly from said heaters and reflected therefrom by said reflectors being directed toward said slot to toast opposite sides of bread or the like in said slot, the modified hyperbolic curve of said reflectors providing that energy reflected thereby diverges away from a horizontal plane through the said heaters to toast by said reflected energy regions of the bread or the like that are more remote than the regions closest to said heaters receiving direct heat energy from the heaters, the sides of the slot fixing the planes of the sides of the bread or the like to be toasted being closer to said heaters than are the upper and lower boundaries of said reflectors, electric circuit means carried by said shell structure adapted to be connected to a source of electrical energy and connected to said heaters for energizing the same, and a cover hingedly carried by said shell structure and swingable in a direction to closed position for covering said slot and protecting said slot from entry through the upper open end of the shell structure, said cover being swingable in a direction to open position for exposing said slot through said upper open end of the shell structure, said cover being swingable in said opening direction to an extent as to be biased to remain in open position until swung back to closed position.

2. A toaster as claimed in claim 1 and including a switch connected in said electrical circuit means and a switch actuator positioned to be operated by said cover upon movement thereof to open said switch upon the cover being swung in one direction and to close said switch upon the cover being moved in an opposite direction whereby the energization of the heaters is controlled by movement of said cover.

3. A toaster as claimed in claim 1 and including end wall members of heat-insulating material joining the ends of said reflectors and closing the opposite ends of the shell structure, said wall members extending below the bottom on said reflectors to form supporting feet and extending in opposite longitudinal directions from the upper portion of the wall members to provide handles for lifting the toaster.

4. In a toaster for bread or the like, the toaster having a slot disposed in a generally upright plane for accommodating the bread or the like during toasting, a pair of elongated electrically energizable radiant infrared heaters disposed generally horizontally each on an opposite side of said slot and intermediate the upper and lower portions of said slot, the heaters extending substantially the full length of said slot, and a pair of reflectors having their reflecting surfaces directed inwardly of the toaster each on an opposite side of said slot, each of said reflecting surfaces being disposed in a generally hyperbolic continuous curve generated about a horizontally disposed axis generally corresponding with the axis of the respective heater, said reflectors extending along said slot on opposite sides thereof and disposed whereby radiant energy from the heaters is emitted directly onto bread or the like in said slot and reflected by the reflecting surfaces onto the bread or the like in said slot, the reflected energy from said reflectors being directed in diverging paths upwardly and downwardly from horizontal planes through said heaters to toast bread or the like remote from the regions in said planes toasted by directly emitted energy, and the heaters being closer to the sides of the slot fixing the respective planes of the sides of the bread or the like to be toasted than to the upper and lower boundaries of said reflectors, respectively.

5. In a toaster as claimed in claim 4 and in which said heaters are quartz glass tubes or the like bearing electrical resistance material displaced radially from the axis thereof and producing quick infra-red energy emitted from said material upon electrical energization thereof.

6. In a toaster as claimed in claim 5 and in which said generally hyperbolic curve of the reflectors is modified from a true hyperbolic curve by the radial displacement of said electrical resistance material from the axis of the respective tube.

7. In a toaster for bread or the like, the combination of a pair of tubular infra-red energy emitters disposed on opposite sides, respectively, of a space accommodating bread or the like in toasting position therein for toasting the opposite sides of the said bread or the like, said emitters extending along the full length of said space and being disposed substantially horizontally and generally midway of the top and bottom areas of said space to be positioned generally midway of the upper and lower edges of the opposite sides of said bread or the like in said space, and a pair of reflectors disposed on opposite sides, respectively, of said space and contoured in curves disposed in upright planes normal to the axis of the respective emitter and curved about centers generally corresponding with each said emitter and extending substantially along the length of said space and the length of each said emitter, said reflectors reflecting infra-red energy received from said emitters toward said space, the bread or the like in said space being toasted by energy emitted directly thereon from the emitters and reflected from the emitters by said reflectors, the curves of said reflectors, respectively, being of such magnitude and form that the said reflected energy is directed in paths diverging from horizontal planes through said emitters to thereby toast bread or the like in areas more remote from the emitters than the areas most proximate to the directly emitted energy from the emitters.

8. The combination claimed in claim 7 and in which the curves of said reflectors are generally hyperbolic in form.

9. The combination claimed in claim 7 and including end wall members of heat insulating material connecting the ends of the reflectors at each opposite end of the toaster to enclose the sides of said space, said end wall members being formed at the bottoms thereof with base portions for supporting the toaster and on oppositely facing sides thereof with handle portions for lifting said toaster.

10. The combination claimed in claim 9 and including a cover hingedly connected to said end wall members and disposed to cover the top of said space when in closed position and to swing aside to expose the top of said space when in open position.

References Cited

UNITED STATES PATENTS

| 1,516,054 | 11/1924 | Mottlau | 99—401 X |
| 1,587,023 | 6/1926 | Mottlau | 99—401 X |
| 2,025,898 | 12/1935 | Rhodes | 219—525 |
| 2,025,899 | 12/1935 | Rhodes. | |
| 2,134,474 | 10/1938 | Gillespie | 126—273 |
| 2,631,523 | 3/1953 | Olving | 99—326 |
| 2,658,984 | 11/1953 | Mohn | 219—354 |
| 2,838,989 | 6/1958 | Clark et al. | 99—401 |
| 2,924,167 | 2/1960 | Rhodes | 99—337 |
| 3,298,300 | 1/1967 | Grebow et al. | 99—337 |

FOREIGN PATENTS

| 222,006 | 6/1962 | Austria. |
| 1,092,481 | 11/1954 | France. |
| 773,316 | 4/1957 | Great Britain. |

BILLY J. WILHITE, *Primary Examiner.*